Sept. 20, 1949.　　M. J. DAWSON ET AL　　2,482,327
CONTAINER FOR CONDIMENTS
Filed Dec. 18, 1945
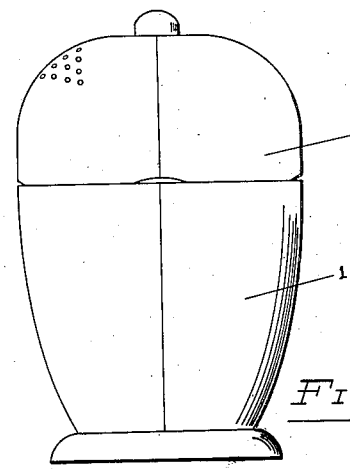
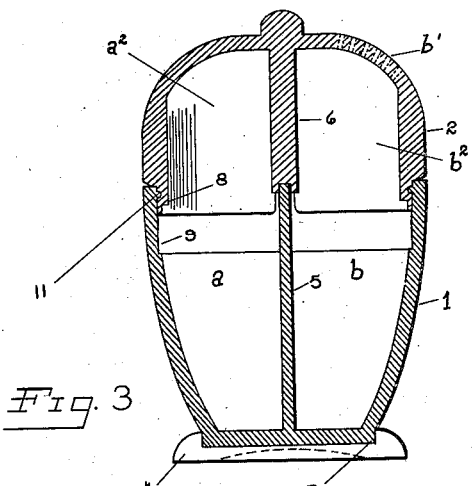
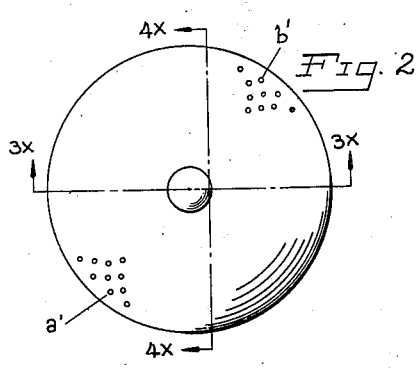
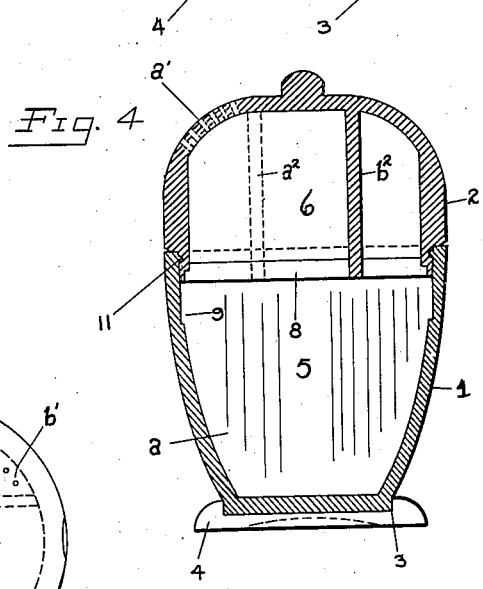
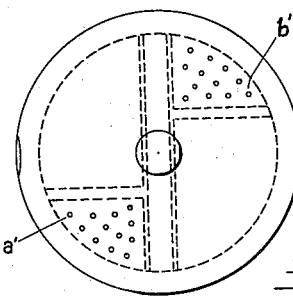
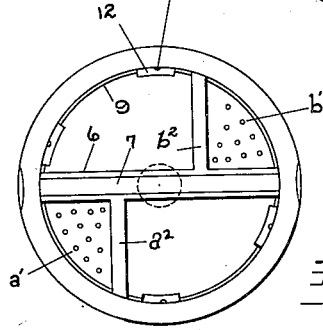
INVENTORS.
Milo J. Dawson
BY Harold L. Epperley
Munn, Liddy, Shannon & Rich
Attys.

Patented Sept. 20, 1949

2,482,327

UNITED STATES PATENT OFFICE 2,482,327

CONTAINER FOR CONDIMENTS

Milo J. Dawson, Jackson, Wyo., and Harold L. Epperly, Inglewood, Calif.

Application December 18, 1945, Serial No. 635,630

1 Claim. (Cl. 65—45)

The present invention has for its object to provide a container for the usual condiments placed on dining tables which is so constructed that a selection of one of the two as desired may be made by the user, or both may be shaken out simultaneously.

Another object of the invention is to provide a dual container divided into compartments and having a top or closure perforated on opposite sides, baffles being arranged therein extending into the compartments to wall off the perforations in such a manner as to prevent the contents of one compartment being discharged when it is desired to only shake the substance out of the other compartment.

The invention also comprehends an arrangement of parts contributing to the easy manufacture of a combined salt and pepper shaker which may be readily molded of plastic material, glass or metal.

To these and other ends the invention embodies further improvements all as will be fully described in the accompanying specification, the novel features thereof being set forth in the appended claim.

In the drawings:

Figure 1 is a side elevation of a condiment holder embodying the invention.

Figure 2 is a top plan view thereof.

Figures 3 and 4 are vertical central sectional views taken at right angles to each other, as indicated by the sectional lines $3^x$—$3^x$ and $4^x$—$4^x$ respectively on Fig. 2.

Figure 5 is a top view, like Fig. 2 showing by dotted lines the relation of the interior walls in the cover to the perforations in the cover piece.

Figure 6 is a bottom plan view of the cover showing an end view of said walls.

Similar reference characters in the several figures indicate similar parts.

A condiment shaker embodying the invention comprises a body portion 1, preferably circular, having a cover or cap 2, the latter being dome shaped and the body being tapered at its lower end, thus giving the complete structure a conventional egg shape. The lower end of the body is flattened somewhat and this area is surrounded by a short shoulder 3 which fits into a correspondingly shaped recess formed in the upper face of a supporting base 4 to which the body may be permanently secured.

The body 1 is divided into two compartments of equal size by a central transversely extending partition 5 the upper end of which terminates in the plane of the parting line between the body and cover. The ingredients contained in the chambers $a$ and $b$ thus formed are prevented from intermingling by also providing the interior of the dome cap with a similar or mating partition 6, the lower end of which is recessed as indicated by 7 in Figs. 5 and 6 to embrace the top edge of the partition 5, as shown in Fig. 3.

Means are provided for securing the cover to the body, whereby the parts are firmly attached yet capable of easy separation, consisting in forming on the cover a depending skirt or annulus 8, inset from the periphery of the cover to closely fit within the upper edge of the body 1. It will be noticed in Figs. 3 and 4 that the upper end of the interior wall of the body is cylindrical in the area where the skirt engages and for a short distance below it, as indicated at 9. The skirt 8 is slotted at opposite sides, in alinement with the ends of the partition 6, so as to fit over the top of the partition 5. On one of these parts, preferably the cap skirt, several small recesses 10 are provided which receive corresponding projections or nubs 11 on the inner wall of the body. In the areas where the recesses 10 are located the skirt is thickened slightly, as indicated at 12. This construction provides a snap fastening that may be engaged and disengaged as necessity requires the flexibility of the parts permitting one to yield relatively to the other to enable the projections to be seated in the recesses. To facilitate the removal of the cap one or more shallow notches may be placed in its lower edge for the insertion of a finger nail or other suitable instrument.

In the construction shown the body 1 and the partition 5 may be formed integrally. However, if desired the body may be made in two halves with a parting line along a plane located centrally of the partition 5, said halves being subsequently cemented together and cemented in the recess in the base 4.

In order to provide for the discharge of the condiments the cap is provided with two sets of perforations $a'$ and $b'$ located with reference to each of the compartments $a$ and $b$ at opposite sides of the partition 6. These respective sets of perforations are located in the curved sides of the dome of the cap adjacent the sides of the partition 6. This places them at opposite sides of the two chambers and in front of each of said sets and extending at right angles to the partition 6 are baffle walls $a^2$—$b^2$. These walls extend vertically downwardly from the top of the cap to the plane defined by the bottom of the skirt 8 and being located off center form constricted upper ends or outlets for the respective chambers $a$ and $b$ in communication each with its own set of perforations $a'$—$b'$. It will therefore be seen that in the natural act of using the device, as a person picks it up and rotates it, to shake some of the contents out of chamber $a$ the perforations $b'$ will be on the upper side of cap and the contents of chamber $b$ will be restrained from reaching its set of perforations by the partition $b^2$ inasmuch as the greater volume of said chamber, which then includes nearly the full capacity of the cap is then lying below the partition $b^2$. A like result occurs when the user elects to discharge the condiment from chamber $b$ through the set of perforations $b'$.

By turning the device completely in an upside down manner it is possible to discharge the contents of both chambers simultaneously.

In practice this dual condiment shaker may be made with its two halves in distinguishing colors, or the halves of the cap alone may be so colored to indicate the contents of the respective compartments.

What is claimed and desired to protect by Letters Patent is:

A condiment shaker comprising a circular body open at its upper end, a cap therefor having a circular side wall provided with a skirt fitting within the open end of the body and provided with a rounded top wall, central partitions in the body and cap extending transversely of said parts, said cap having in its top sets of perforations located at opposite sides of said partition adjacent the side walls of the cap, and baffles located off center in the cap at right angles to the partition therein and forming restricted outlets leading to their respective sets of perforations.

MILO J. DAWSON.
HAROLD L. EPPERLY.

REFERENCES CITED

The following references are of record in the file of this patent:

UNITED STATES PATENTS

| Number | Name | Date |
|---|---|---|
| 1,511,817 | Montague | Oct. 14, 1924 |
| 1,715,754 | Harris | June 4, 1929 |
| 1,979,198 | Hart | Oct. 30, 1934 |
| 2,156,554 | Vitek | May 2, 1939 |
| 2,184,302 | Hull et al. | Dec. 26, 1939 |
| 2,216,345 | Haskin et al. | Oct. 1, 1940 |
| 2,354,004 | Fess | July 18, 1944 |